US012606369B2

(12) United States Patent
Gomes Das Neves Monteiro

(10) Patent No.: US 12,606,369 B2
(45) Date of Patent: Apr. 21, 2026

(54) SYSTEM FOR PREVENTING THE FORMATION OF FUEL VAPOR

(71) Applicants: Leo Krakowiak, São Paulo (BR); Amandio Gomes Das Neves Monteiro, São Paulo (BR)

(72) Inventor: Amandio Gomes Das Neves Monteiro, São Paulo (BR)

(73) Assignees: Leo Krakowiak, São Paulo (BR); Amandio Gomes Das Neves Monteiro, São Paulo (BR)

( * ) Notice: Subject to any disclaimer, the term of this patent is extended or adjusted under 35 U.S.C. 154(b) by 100 days.

(21) Appl. No.: 18/280,281

(22) PCT Filed: Mar. 4, 2022

(86) PCT No.: PCT/BR2022/050070
§ 371 (c)(1),
(2) Date: Sep. 5, 2023

(87) PCT Pub. No.: WO2022/183267
PCT Pub. Date: Sep. 9, 2022

(65) Prior Publication Data
US 2024/0067446 A1 Feb. 29, 2024

(30) Foreign Application Priority Data
Mar. 5, 2021 (BR) .......................... 10 2021 004207 9

(51) Int. Cl.
*B65D 90/38* (2006.01)
*B60K 15/03* (2006.01)
*F17C 13/12* (2006.01)

(52) U.S. Cl.
CPC .............. *B65D 90/38* (2013.01); *B60K 15/03* (2013.01); *F17C 13/126* (2013.01);
(Continued)

(58) Field of Classification Search
CPC .. B65D 90/38; B65D 88/128; B65D 90/0033; B65D 90/10; B65D 88/62; B65D 90/028;
(Continued)

(56) References Cited

U.S. PATENT DOCUMENTS 3,747,800 A      7/1973 Viland
4,539,836 A *    9/1985 Hester ................. G01M 3/3272
                                                73/49.3
(Continued)

FOREIGN PATENT DOCUMENTS

CN      109336041      2/2019
EP      1719714        11/2006
(Continued)

OTHER PUBLICATIONS

International Search Report and the Written Opinion Dated May 20, 2022 From the International Searching Authority Re. Application No. PCT/BR2022/050070 and its Translation of the Search Report into English. (9 Pages).
(Continued)

*Primary Examiner* — Kareen K Thomas

(57) ABSTRACT

The present invention provides a system (1) to prevent the formation of fuel vapors comprising a containment tank (10) and a variable volume tank (12) accommodatable within the containment tank (10), wherein the variable volume tank (12) is configured to receive liquid fuel. Our invention can be used in any tanks or reservoirs of liquid products that attack the ozone layer, preventing the formation of vapors that are extremely harmful to nature and the environment.

8 Claims, 4 Drawing Sheets

(52) U.S. Cl.
CPC ............... *B60K 2015/03085* (2013.01); *F17C*
*2201/0176* (2013.01); *F17C 2260/042*
(2013.01)

(58) Field of Classification Search
CPC ........... B65D 90/046; B65D 2590/046; B65D
90/28; B60K 15/03; B60K 2015/03085;
B60K 2015/0775; F17C 13/126; F17C
2201/0176; F17C 2260/042; B64D 37/32;
B67D 7/54; B67D 7/32
See application file for complete search history.

(56) References Cited

U.S. PATENT DOCUMENTS

| | | | | |
|---|---|---|---|---|
| 4,615,455 | A | * 10/1986 | Tansill | B60K 15/03 |
| | | | | 220/88.1 |
| 5,722,374 | A | * 3/1998 | Kidokoro | B60K 15/035 |
| | | | | 123/518 |
| 5,979,481 | A | 11/1999 | Ayresman | |
| 6,260,544 | B1 | * 7/2001 | Spry | B60K 15/03504 |
| | | | | 220/721 |
| 6,286,552 | B1 | * 9/2001 | Shimbori | B23K 11/002 |
| | | | | 220/721 |
| 6,412,476 | B1 | * 7/2002 | Thompson | F02M 37/0082 |
| | | | | 138/31 |
| 6,527,002 | B1 | * 3/2003 | Szakaly | B65D 90/38 |
| | | | | 220/88.1 |
| 6,626,157 | B2 | * 9/2003 | Perry | F02M 25/0809 |
| | | | | 123/198 D |
| 6,681,789 | B1 | * 1/2004 | Moulis | F16K 24/04 |
| | | | | 220/88.3 |

FOREIGN PATENT DOCUMENTS

| | | |
|---|---|---|
| FR | 2643344 | 8/1990 |
| JP | 51-55416 | 10/1974 |
| WO | WO 99/47434 | 9/1999 |
| WO | WO 2005/095155 | 10/2005 |

OTHER PUBLICATIONS

Supplementary European Search Report and the European Search Opinion Dated Aug. 20, 2024 From the European Patent Office Re. Application No. 22762273.5. (7 Pages).

Substantive Report Dated Jan. 26, 2025 From the Saudi Authority for Intellectual Property Re. Application No. 523450533 and Its Translation Into English. (9 Pages).

Notification of Office Action and Search Report Dated Jul. 24, 2025 From the National Intellectual Property Administration of the Poeple's Republic of China Re. Application No. 202280016472.9 and Its Translation of Office Action Into English. (11 Pages).

Decision of Refusal Dated Nov. 8, 2025 From the National Intellectual Property Administration of the People's Republic of China Re. Application No. 202280016472.9 and Its Translation Into English. (11 Pages).

Notice of Reasons for Rejection Dated Jan. 13, 2026 From the Japan Patent Office Re. Application No. 2023-553980. (14 Pages).

* cited by examiner

SYSTEM FOR PREVENTING THE FORMATION OF FUEL VAPOR

RELATED APPLICATIONS

This application is a National Phase of PCT Patent Application No. PCT/BR2022/050070 having International filing date of Mar. 4, 2022, which claims the benefit of priority of Brazil Patent Application No. BR 102021004207 9 filed on Mar. 5, 2021. The contents of the above applications are all incorporated by reference as if fully set forth herein in their entirety.

FIELD AND BACKGROUND OF THE INVENTION

This invention is related to the field of containers for storage or transportation of volatile materials, for example, liquid fuels, mainly those of fossil origin. Specifically, this invention relates to a system to prevent the formation of fuel vapors during the filling or emptying of containers of any nature. It can be applied in the most varied segments; in addition to those described below in the 04 chains. We see applications in boiler tanks or reservoirs, ships, recreational boats, large and small airplanes, trains, generators in the most varied applications, use in small packages as solvents for cleaning and painting, etc.

SUMMARY OF THE INVENTION

The commercialization of fuels involves four main chains, namely: a) the storage carried out by the distributors; b) the transport, often carried out by means of tank trucks; c) the distribution through gas stations; and d) the consumption of automotive vehicles.

During the operations of such storage, transportation, distribution, and consumption chains, fuels are typically stored in reservoirs, mainly in fuel tanks that have a constant volume. In such tanks of constant volume, vapors are formed to fill the space as the tanks are emptied.

In general, storage and distribution chains use stationary and larger volume tanks. Transport and consumption chains, on the other hand, use smaller but moving tanks, which increases the number of vapors formed and released.

During the use of water trucks, usually, the liquid fuel does not fill the entire volume of the fuel tank, as a free space of liquid is left in the tank. Thus, the liquid fuel moves inside the tank as the tank truck moves. Therefore, the movement of liquid fuel inside the tank promotes a displacement of the vehicle's center of gravity, which can cause instability in curves and emergency braking.

Systems for reducing the emission of vapors from fuel tanks are known in the technics. The document CN205838568 (U) reveals a vapor recovery system for a filling station including a fuel storage tank, which is connected to an inert gas tank, filled with helium, a fuel outlet pipe, and a fuel-gas separator. In CN205838568 (U), the fuel outlet pipe is connected to the fuel outlet of the refueling gun and is also supplied with a vacuum pump. The fuel-gas separator is respectively connected to two fuel and gas desorption tanks and a condenser, where the condenser is connected to a fuel return pipe and the fuel return pipe is connected to an air suction port in a supply gun to extract fuel and gas from the car's fuel tank.

The document U.S. Pat. No. 6,527,002 (B1) reveals an apparatus and method for use with a tank to store a substance and, in particular, where the stored substance is subject to evaporative losses. The substance stored in the tank is a volatile liquid, such as gasoline, light hydrocarbons, distilled liquids, or alcohol. The U.S. Pat. No. 6,527,002 (B1) apparatus comprises first and second bags, a network of tubes to provide a means of inflation to the bags, and a pressure control unit to control the inflation pressure of the bags. U.S. Pat. No. 6,527,002 (B1) discloses that the medium used to inflate the bags is air and also that an inert gas inlet nozzle is connected to the tank. The inert gas inlet nozzle incorporates a ball valve so that the inert gas inlet nozzle is normally closed.

The document U.S. Pat. No. 4,131,141 (A) refers to a vapor retention system of contained volatile liquids. The U.S. Pat. No. 4,131,141 (A) system includes a bag inside a stationary or mobile storage tank. In the upper wall of the U.S. Pat. No. 4,131,141 (A) tank, there is an opening in which a breather valve assembly is located. In addition, the system comprises a collar involving an appropriate opening on the breather valve provided with a seal ring adapted to be secured by the washer when the breather valve assembly is fixed in place, thereby sealing the opening at the top of the tank.

The document DE19813349 (C1) describes a system for producing a low emission pressure equalization in a closed tank containing a vapor-forming liquid. The DE19813349 (C1) system comprises a closed tank containing a vapor-forming liquid and an associated fixed-bed adsorbent to receive the vapors that escape during the filling of the tank as well as an air exhaust line and a suction line for equalization of pressure when the tank is filled and emptied. In DE19813349 (C1), the connection line branches from the tank to the fixed-bed adsorbent in a vacuum line with a vacuum pump and a pressure line with a remotely controlled valve, which controls the bridge vacuum pump. In addition, the suction line connected to the fixed-bed adsorbent on the atmosphere side has a diaphragm or a choke valve and the exhaust airline has a remote control valve. The DE19813349 (C1) system also includes a control circuit that opens at least the remotely controlled valve in the pressure line during a filling phase and turns on the vacuum pump during an emptying phase and, at the same time, the valve on the pressure line closes.

As can be seen, however, none of the cited documents describes a system capable of preventing the formation of vapors inside the fuel tank, in order to reduce the attack on the ozone layer and contribute to the reduction of global warming in the operations of storage, transportation, distribution and consumption of liquid fuels. Furthermore, these documents do not reveal a system capable of preventing the movement of liquid fuel inside the tank of a moving vehicle, in order to maintain the stability of this vehicle.

The purpose of this invention is to provide a system that can prevent the formation of vapors inside a fuel tank.

Another purpose of this invention is to provide a system to prevent the movement of liquid fuel inside the tank of a mobile vehicle.

This invention reveals a system for preventing the formation of fuel vapors comprising a containment tank and a variable volume tank that is accommodable inside the containment tank, wherein the variable volume tank is configured to receive liquid fuel.

DESCRIPTION OF SPECIFIC EMBODIMENTS OF THE INVENTION

The following description will start from a preferred embodiment of the invention, applied to a system to prevent the formation of fuel vapors.

This invention shows a system for preventing the formation of fuel vapors comprising a containment tank and a variable volume tank that is accommodable inside the containment tank, wherein the variable volume tank is configured to receive liquid fuel.

Figure 1:
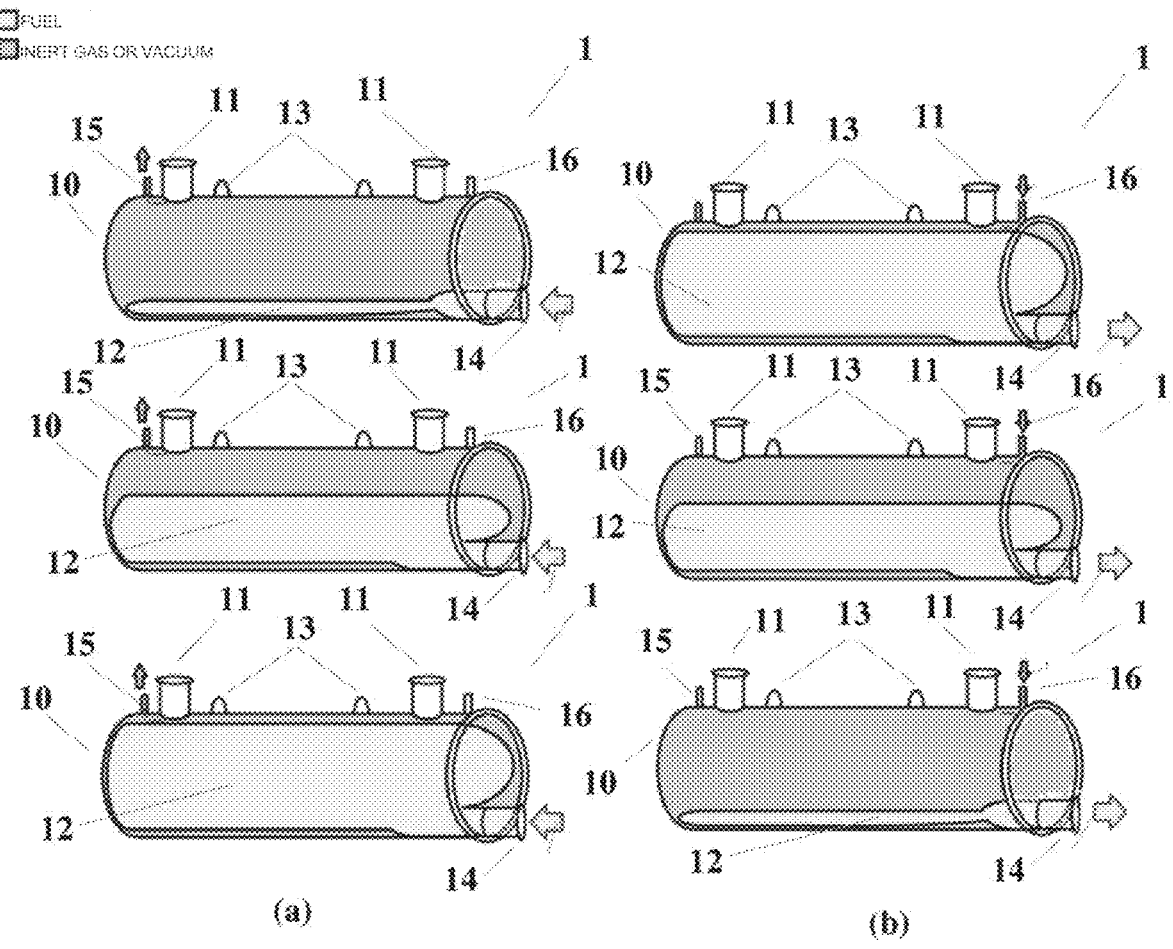
FIG. 1—Schematic views of a system to prevent the formation of fuel vapors—(a) filling a balloon-type variable volume tank; (b) emptying the balloon-type variable volume tank.

FIG. 1 schematically illustrates a system 1 for preventing the formation of fuel vapors. System 1 includes a containment tank 10 and a variable volume tank 12 which is accommodated inside the containment tank 10 and which receives liquid fuel therein.

FIG. 1(a) illustrates the filling operation of a variable volume tank 12 and FIG. 1(b) illustrates the emptying of the variable volume tank 12. The variable volume tank 12 is, for example, of balloon type and can be made of an inert and flexible polymeric material, which allows a satisfactory elongation and is mechanically resistant.

In this embodiment, the liquid fuel is supplied to the variable volume tank 12 by means of, at least, one quick-release coupling 14 coupled to one end of the variable volume tank 12. Additionally, system 1 includes lifting loops 13 that are attached to the containment tank 10 in order to facilitate its transport. System 1 also comprises inspection nozzles 11 coupled to the containment tank 10.

The containment tank 10 envelops the variable volume tank 12 and prevents any ruptures in the variable volume tank from causing leaks to the ground or air. In addition, the space between the interior of the containment tank and the variable volume tank 12 may include fuel vapor sensors and/or cameras for monitoring.

Preferably, system 1 comprises an inert gas line 16 coupled to the containment tank 10. The inert gas line 16 supplies pressurized inert gas to the interior of the containment tank 10 and externally to the variable volume tank 12. The inert gas is suitable for use in system 1 as it is non-reactive and non-combustible, and it helps to empty the tank.

System 1 may also include a vacuum line 15 comprising a vacuum gauge. The vacuum line 15 forms a vacuum in the space between the interior of the containment tank 10 and the variable volume tank 12, which facilitates the filling of the tank.

The variable volume tank 12 can be completely filled with liquid fuel and expands inside the containment tank 10, so that there is no space to be filled by any gaseous substance, be it fuel or air vapor or a combination of both.

As the inert gas and vacuum act on the external side of the variable volume tank 12, there is no contact between the gases and the liquid fuel and, therefore, system 1 prevents the formation of fuel vapors.

Figure 2:
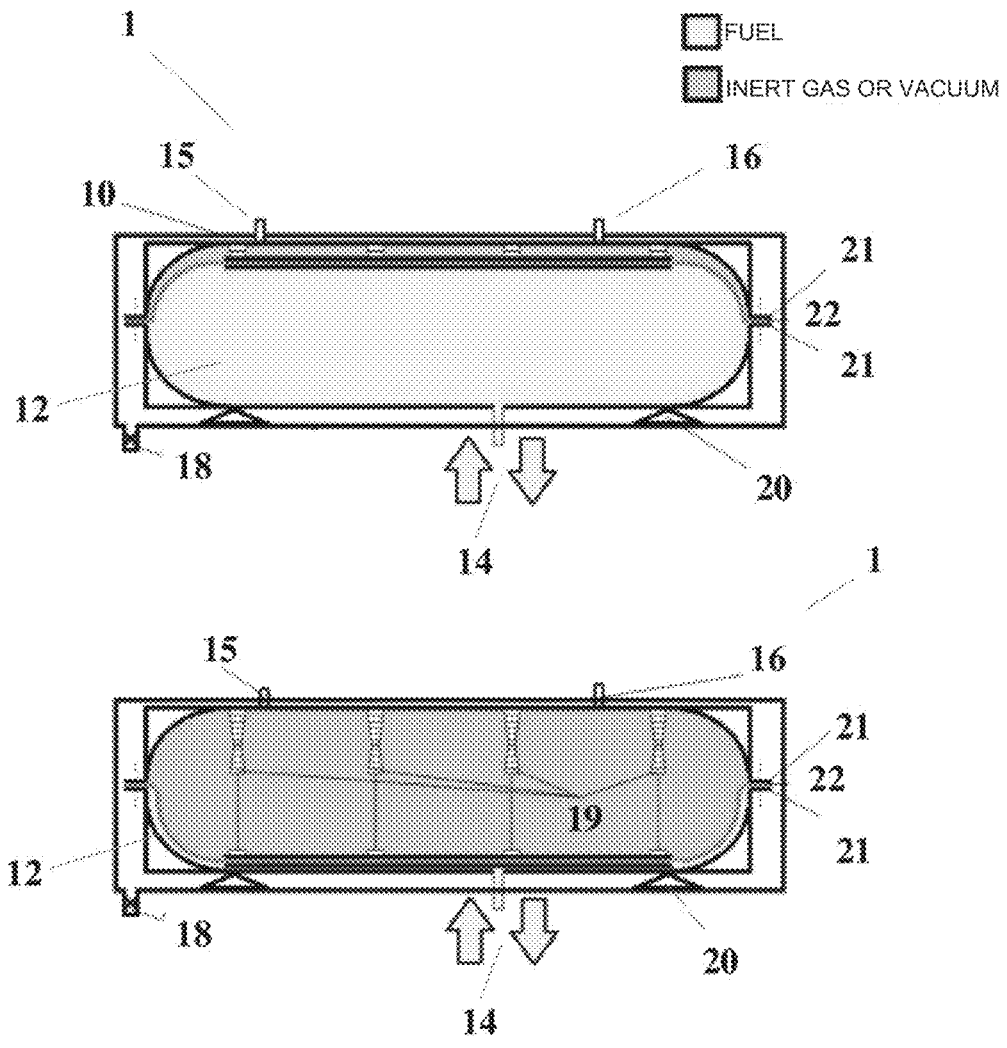
FIG. 2—Schematic view of the system to prevent the formation of fuel vapors in which the variable volume tank is diaphragm type.

FIG. 2 schematically illustrates system 1 comprising a variable volume tank 12 of the diaphragm type. In this embodiment, system 1 includes a plurality of guides 19 coupled to the variable volume tank 12, by means of plates 21 attached to, at least, one element of elastic material 22. The guides 19 limit the movement of the variable volume tank 12 during filling and emptying of the tank with liquid fuel.

System 1 can also include at least one ball valve 18 coupled to the containment tank 10. In addition, system 1 may comprise a plurality of supports 20 coupled to the bottom side of the containment tank 10.

Figure 3:
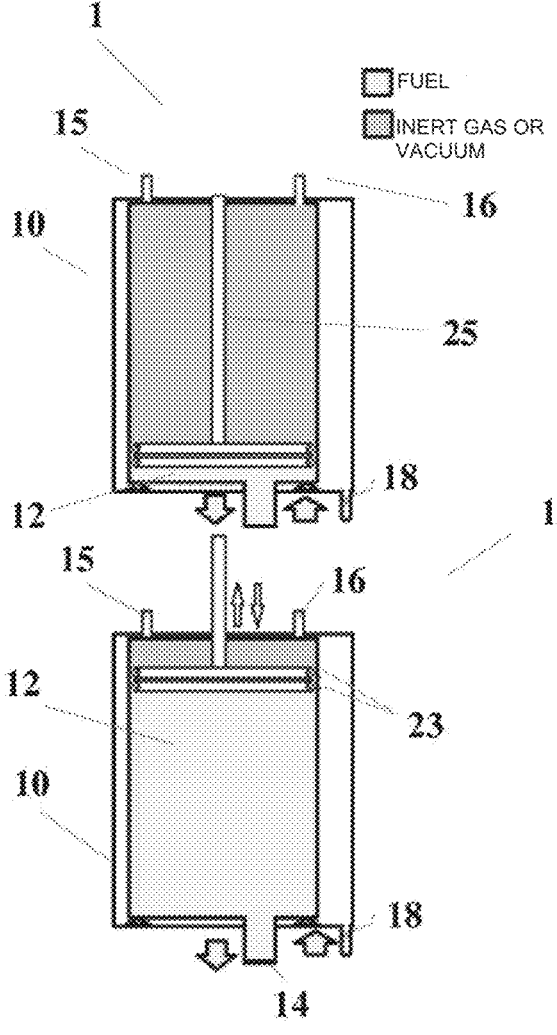
FIG. 3—Schematic view of the system to prevent the formation of fuel vapors where the variable volume tank is of the piston type.

FIG. 3 shows schematically system 1 comprising a variable volume tank 12 of the piston type. In the embodiment of FIG. 3, system 1 includes a plunger 25 coupled to the variable volume tank 12. The variable volume tank 12 further includes a plurality of seals 23 to prevent leakage of liquid fuel.

Figure 4:
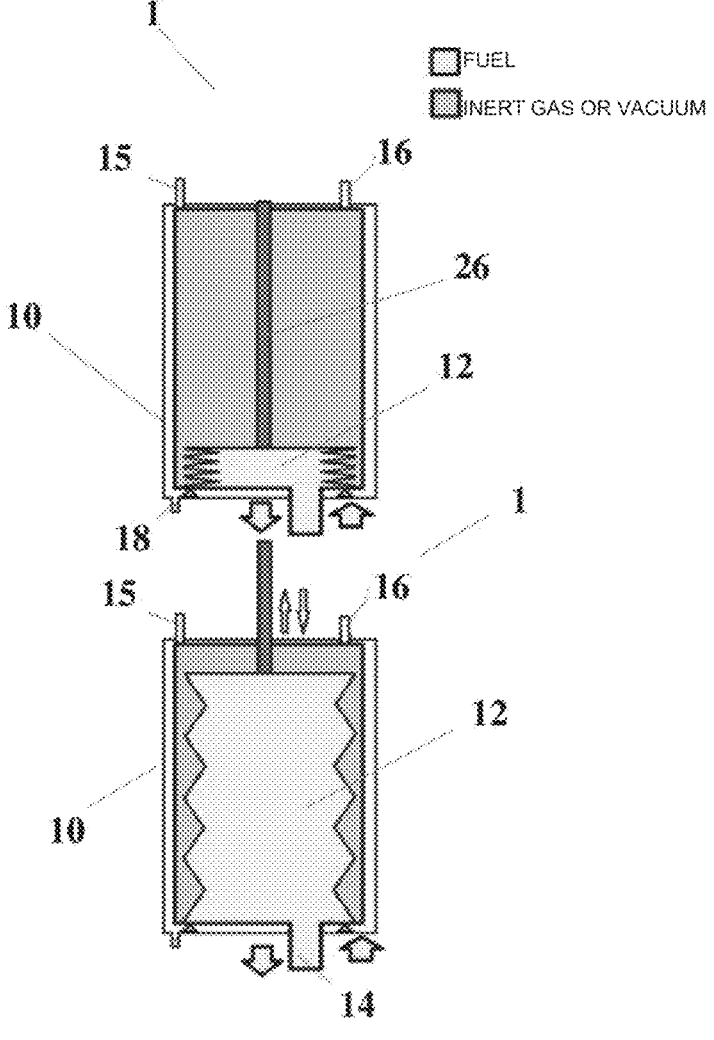
FIG. 4—Schematic view of the system to prevent the formation of fuel vapors in which the variable volume tank is a bellow-type element.

FIG. 4 schematically illustrates system 1 including a variable volume tank 12 of a bellow-type element. In this embodiment, the system includes a guide rod 26 coupled to the variable volume tank 12 to guide the movement of the variable volume tank 12 when filling/emptying with liquid fuel.

System 1, when operated normally, prevents the formation of fuel vapors. The only way to form vapors inside the variable volume tank 12 would be due to the operator's failure during the coupling of the quick-release coupling 14.

This invention solves the technical problem of preventing the production of vapors from liquid fuels, mainly those of fossil origin, inside reservoirs. For this purpose, this invention uses a system 1 comprising a containment tank 10 and a variable volume tank 12 accommodable within the containment tank 10.

The variable volume tank 12 is filled with liquid fuel so that it does not have contact with any gaseous substance, thus preventing the formation of fuel vapors. Thus, the present invention is particularly advantageous as it inhibits the release of vapors into the atmosphere, reducing the attack on the ozone layer and contributing to reducing global warming.

In addition, by completely filling the variable volume tank 12 with liquid fuel, system 1 of this invention prevents the movement of this fuel inside the tank in transport situations by means of vehicles, such as tank trucks. In this way, the present invention avoids the displacement of the vehicles' center of gravity, improving their performance in curves and brakes.

Another advantage of system 1 of this invention is the possibility of not using fuel pumps and/or return systems in vehicles since system 1 works with controlled positive pressure. It also reinforces the fact that this invention is not limited to the particular configurations/embodiments described above.

The invention claimed is:

1. A system to prevent formation of fuel vapors comprising:
   a containment tank;
   a variable volume tank accommodable within the containment tank; and
   at least one ball valve coupled to the containment tank;
   wherein the variable volume tank is configured to receive liquid fuel; and
   wherein the system further comprises a vacuum line with a vacuum gauge, wherein the vacuum line is configured to form a vacuum in a space between an interior of the containment tank and the variable volume tank;

5

6 wherein the system further comprises any one of a plurality of guides, a plunger and a guide rod coupled to the variable volume tank.

2. The system according to claim 1, further comprising at least one quick coupling type connection attached to one end of the variable volume tank to supply liquid fuel to the variable volume tank.

3. The system according to claim 1, further comprising lifting handles coupled to the containment tank.

4. The system according to claim 1, further comprising inspection nozzles coupled to the containment tank.

5. The system according to claim 1, further comprising an inert gas line coupled to the containment tank configured to supply pressurized inert gas to the interior of the containment tank externally to the variable volume tank.

6. The system according to claim 1, wherein that the variable volume tank comprises any one of a balloon, a diaphragm, a piston, and an accordion element.

7. The system according to claim 1, further comprising any one of a plurality of plates, at least one element of elastic material and a plurality of seals coupled to the variable volume tank.

8. The system according to claim 1, further comprising a plurality of supports coupled to the containment tank.

* * * * *